United States Patent [19]

Mutoh et al.

[11] Patent Number: 4,767,976

[45] Date of Patent: Aug. 30, 1988

[54] CONTROL SYSTEM FOR PWM INVERTER

[75] Inventors: Nobuyoshi Mutoh, Katsuta; Akiteru Ueda, Ibaraki; Motonobu Hattori, Chiba; Satoshi Ibori, Funabashi; Hideyuki Shimonabe, Chiba; Kenji Nandoh, Matsudo, all of Japan

[73] Assignee: Hitachi, Ltd., Tokyo, Japan

[21] Appl. No.: 37,853

[22] Filed: Apr. 13, 1987

[30] Foreign Application Priority Data

Apr. 14, 1986 [JP] Japan ................................. 61-84130

[51] Int. Cl.$^4$ ............................................. H02P 5/40
[52] U.S. Cl. ..................................... 318/808; 318/807
[58] Field of Search ............................... 318/807–811, 318/808, 803, 805

[56] References Cited

U.S. PATENT DOCUMENTS

| 4,330,741 | 5/1982 | Nagase et al. | 318/808 |
| 4,451,771 | 5/1984 | Nagase et al. | 318/800 |
| 4,503,375 | 3/1985 | Okuyama | 318/805 |
| 4,672,287 | 6/1987 | Fujioka et al. | 318/800 |
| 4,680,526 | 7/1987 | Okuyama et al. | 318/805 |

Primary Examiner—David Smith, Jr.
Attorney, Agent, or Firm—Antonelli, Terry & Wands

[57] ABSTRACT

A control system for controlling a PWM inverter so that the inverter drives an induction motor at a variable voltage and a variable frequency while keeping constant a ratio of the output voltage of the inverter to the output frequency thereof, is disclosed which includes current component detecting means for detecting an effective current corresponding to a load, from the input current of the induction motor, frequency setting means for setting the output frequency of the PWM inverter, flux setting means for setting the amount of magnetic flux generated in the induction motor, correcting-frequency calculating means for calculating a frequency correcting quantity proportional to the effective current, and correcting-flux calculating means for calculating a flux correcting quantity proportional to the effective current. In a case where the detected effective current is judged to be less than a predetermined value, the frequency correcting quantity is added to the set output frequency to obtain an output frequency command, and the sum of the flux correcting quantity and the set amount of magnetic flux is multiplied by the value of the output frequency command to obtain an output voltage command, for the purpose of controlling the operation of the PWM inverter on the basis of the output frequency command and the output voltage command.

9 Claims, 9 Drawing Sheets

CONTROL SYSTEM FOR PWM INVERTER

BACKGROUND OF THE INVENTION

The present invention relates to a control system for an induction motor, and more particularly to a control system for controlling a PWM inverter so that the PWM inverter drives an induction motor at a variable voltage and a variable frequency (namely, a variable motor speed) while keeping constant a ratio of the applied voltage of the motor to the input frequency thereof.

In a case where an induction motor is driven by an inverter, the constant V/f ratio control method is widely used, in which the induction motor is driven at a variable speed while keeping constant the ratio of an A.C. voltage V applied to the induction motor to the frequency f of the A.C. voltage. In the constant V/f ratio control method, however, when the load of the motor is decreased, a superfluous magnetizing current flows through the motor, and thus it is impossible to drive the motor efficiently. In order to solve this problem, various methods have been proposed. For example, a system for controlling the ratio of the output frequency of an inverter to the output voltage thereof is disclosed in Japanese Patent Application No. (JP-A-57-183,297) filed on May 6, 1981 by Toshiba Corporation. In almost all of the above methods, the input current of the inverter (namely, a D.C. current) or the primary current of the motor is detected, and the output voltage of the inverter is controlled so as to be proportional to the value of detected current.

In conventional control systems, the motor current (namely, primary current) does not always correspond to the load of the motor, and hence the motor cannot be driven efficiently. That is, even in, no load condition, a fairly high voltage will be applied to the motor, depending on a certain value of the voltage and frequency set for the motor. In this case, the magnetizing current increases, and the motor current (namely, the primary current) also becomes large. When the voltage applied to the motor is increased in the above state so as to be proportional to the current value, the motor current is more increased since the exciting coil of the motor is put in an over excitation state so as to be in a saturate condition. Accordingly, the efficiency of the motor is lowered, and an over current flows through the motor. Then, a breaker for connecting the inverter to an A.C. power source is made open. Thus, the inverter is put in such a state as PWM signals are stopped to apply to the inverter, and then cannot drive the motor.

Further, according to the conventional control systems, the magnetic flux is controlled by varying the input voltage, and hence a desired torque is generated later than an input voltage by an amount corresponding to a secondary time constant. Accordingly, when the load of the motor increases abruptly, the motor speed decreases greatly, and the slip is increased. Thus, the primary current is increased, and this leads the PWM inverter to the overcurrent trip state. The above-mentioned problems are caused by the fact that the detected motor current does not always correspond to the load of the motor.

SUMMARY OF THE INVENTION

It is an object of the present invention to provide a control system for a PWM inverter which control system can prevent the PWM inverter from being put in an overcurrent trip state even when the load of an induction motor driven by the PWM inverter varies abruptly.

In order to attain the above object, according to the present invention, there is provided a control system for a PWM inverter, in which control system the output voltage and output frequency of the PWM inverter (namely, the input voltage and input frequency of a motor driven by the PWM inverter) are controlled by an inverter frequency command and a voltage command both determined from an effective current in the following manner. First, the effective current is detected from a motor current. Then, a frequency compensating signal proportional to the effective current is added to a set value of inverter frequency, to obtain the inverter frequency command, and the output frequency of the inverter is controlled by the inverter frequency command. Further, a flux compensating value proportional to the effective current is added to a set value of magnetic flux, to obtain a flux command signal, and the product of the flux command signal and the inverter frequency command signal is formed to obtain the voltage command signal, which is used for controlling the output voltage of the inverter.

In a case where the effective current exceeds a predetermined value owing to an increase in the load of the motor, the inverter frequency command is decreased or increased according to whether the motor is put in a driving state (an accelerating state and a steady state) or a regenerating state (a decelerating state), and the inverter frequency command thus modified controls the output frequency of the inverter so that the output torque of the motor is kept constant.

In more detail, in a case where the effective current is smaller than the predetermined value, the generation of overcurrent trip can be prevented by the following operation. When the load of the motor increases abruptly, the voltage drop due to the primary impedance of the motor is increased. Thus, the magnetizing current decreases, and the effective current (namely, a secondary current) increases. In the present invention, the flux compensating value proportional to the effective current is used for forming the voltage command signal. That is, when the load increases abruptly, the flux compensating value increases, and hence the value of the voltage command signal increases. Thus, even when the load increases, the reduction in magnetizing current can be prevented, and the increase in primary current due to the abrupt increase in effective current can be prevented.

In a case where the effective current exceeds the predetermined value, the inverter is prevented from instantly getting into an overcurrent trip by the following manner. Now, let us consider a case where the motor is kept at a steady state, by way of example. When the effective current exceeds the predetermined value, the inverter frequency command signal is decreased in accordance with a predetermined time constant. As soon as the inverter frequency decreases, the torque which is generated by the motor (namely, motor torque) is decreased, and the motor current is once decreased. However, the effective current again increase to the predetermined value, provided that the motor is applied with a load greater than the motor torque. Each time the effective current reaches the predetermined value, the value of the frequency command signal is reduced to decrease the inverter frequency, thereby preventing the motor current from exceeding a predetermined value (for example, a rated value). By the above control operation, the inverter is prevented from instantly getting into the overcurrent trip even when an overload is abruptly applied to the motor.

In the above, the control operation in the steady state of the motor has been explained. In the accelerating and decelerating states of the motor, also, the inverter frequency is increased or decreased so as to keep the effective current constant, and thus there is no fear of the inverter getting into the overcurrent trip abruptly.

DESCRIPTION OF THE PREFERRED EMBODIMENTS

Figure 1:
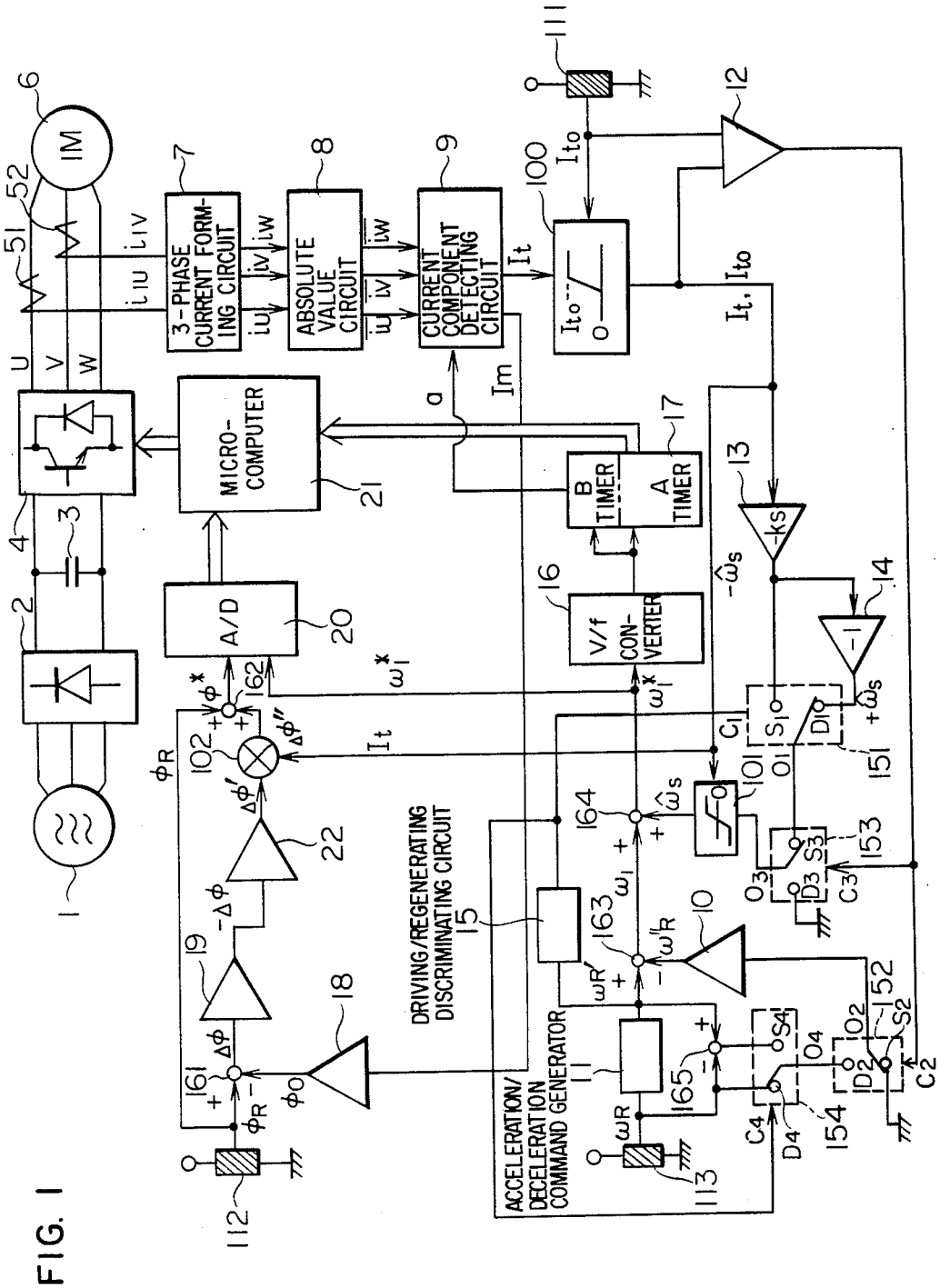
FIG. 1 is a block diagram showing an embodiment of an inverter control system according to the present invention.

FIG. 1 shows an embodiment of an inverter control system according to the present invention.

Referring to FIG. 1, a rectifier 2 is connected to an A.C. power source 1 to convert an A.C. voltage from the power source 1 into a D.C. voltage, and the D.C. output side of the rectifier 2 is connected to a smoothing capacitor 3. Further, a PWM inverter 4 is connected to the smoothing capacitor 3, to convert the D.C. voltage from the rectifier 2 into a 3-phase A.C. voltage having a variable amplitude and a variable frequency. A 3-phase induction motor 6 is connected to the A.C. output side of the inverter 4, to operate at a variable speed while keeping constant the ratio of the input voltage of the motor to the input frequency thereof.

The U-phase and V-phase output currents of the PWM inverter 4 (namely, the U-phase and V-phase primary currents of the motor 6) are detected by current transformers 51 and 52, respectively. The currents $i_{1u}$ and $i_{1v}$ detected by the current transformers 51 and 52 are applied to a 3-phase current forming circuit 7, to determine the W-phase primary current $i_{1w}=-(i_{1u}+i_{1v})$ of the motor 6 from the primary currents $i_{1u}$ and $i_{1v}$. Primary current detection signals $i_u$, $i_v$ and $i_w$ from the circuit 7 are applied to an absolute value circuit 8, which eliminates a D.C. component and higher harmonic components from each of the primary current detection signals $i_u$, $i_v$ and $i_w$, and then makes the absolute value of each primary current detection signal to generate absolute value signals $\bar{i}_u$, $\bar{i}_v$ and $\bar{i}_w$. These signals $\bar{i}_u$, $\bar{i}_v$ and $\bar{i}_w$ are applied to a current component detecting circuit 9, which is also applied with a 30° phase signal a from a timer circuit 17. The 30° phase signal a will be explained later.

Figure 2:
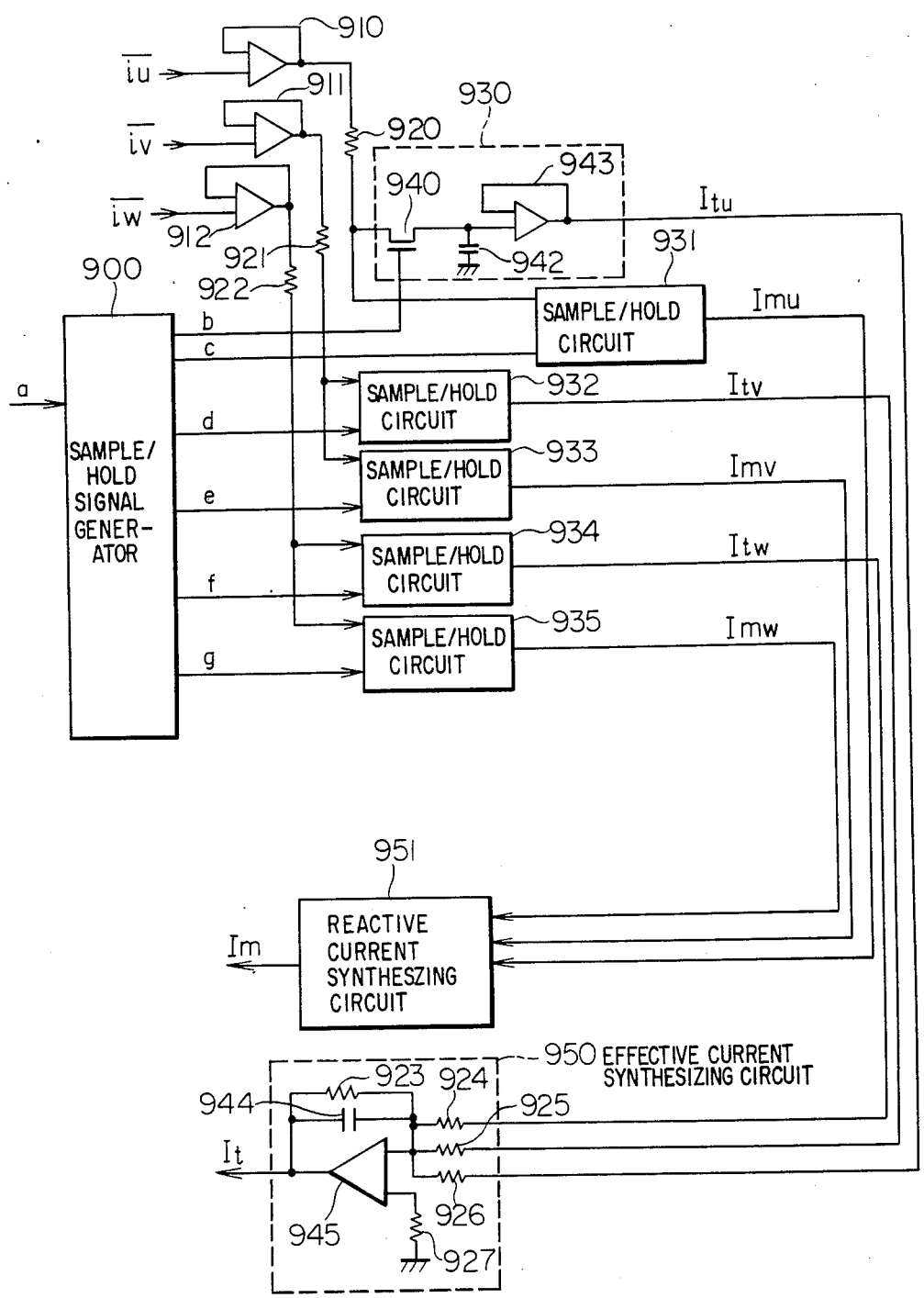
FIG. 2 is a block diagram showing the current component detecting circuit of FIG. 1 in detail.

FIG. 2 shows an example of the current component detecting circuit 9.

Referring to FIG. 2, the absolute signals $\bar{i}_u$, $\bar{i}_v$ and $\bar{i}_w$ are applied to operational amplifiers 910, 911 and 912, respectively. Each of these operational amplifiers is a voltage isolator for isolating its input and output from each other. The output terminal of the operational amplifier 910 is connected to one end of a resistor 920, the other end of which is connected to sample/hold circuits 930 and 931. The output terminal of operational amplifier 911 is connected to one end of a resistor 921, the other end of which is connected to sample/hold circuits 932 and 933. The output terminal of the operational amplifier 912 is connected to one end of a resistor 922, the other end of which is connected to sample/hold circuits 934 and 935. The sample/hold circuits 930 to 935 have the same circuit configuration, and the detailed construction of the sample/hold circuit 930 is shown in FIG. 2, by way of example. That is, each of the circuits 930 to 935 is made up of a switch 940, a capacitor 942 and an operational amplifier 943. The gate terminals of the switches 940 of the sample/hold circuits 930 to 935 are connected to output terminals of a sample/hold signal generating circuit 900, to be applied with sample/hold signals b, c, d, e, f and g, respectively. The output terminals of the sample/hold circuits 930, 932 and 934 are connected to resistors 924, 925 and 926 of an effective current synthesizing circuit 950, respectively. The effective current synthesizing circuit 950 is a first-order lag element made up of resistors 923 to 927, a capacitor 944 and an operational amplifier 945, and operates as a first-order lag element. The effective current synthesizing circuit 950 produces the sum of a U-phase effective current $I_{tu}$, a V-phase effective current $I_{tv}$ and a W-phase effective current $I_{tw}$ which are delivered from the sample/hold circuits 930, 932 and 934, respectively, to deliver the sum as an effective current $I_t$. While, the output signals $I_{mu}$, $I_{mv}$ and $I_{mw}$ of the sample/hold circuits 931, 933 and 935 are applied to a reactive current synthesizing circuit 951, which has substantially the same circuit configuration as the effective current synthesizing circuit 950. The reactive current synthesizing circuit 951 produces the sum of the U-phase reactive current $I_{mu}$, the V-phase reactive current $I_{mv}$ and the W-phase reactive current $I_{mw}$, to deliver the sum as a reactive current $I_m$. Briefly speaking, the current component detecting circuit 9 having the above circuit construction performs a sampling operation for the absolute value signals $\bar{i}_u$, $\bar{i}_v$ and $\bar{i}_w$ at specified phase angles of a phase voltage in accordance with the sample/hold signals which are generated by the sample/hold signal generating circuit 900 on the basis of the 30° phase signal a, to obtain the effective current $I_t$ and the reactive current $I_m$.

Referring now back to FIG. 1, the effective current $I_t$ obtained by the current component detecting circuit 9 is applied to a torque limiting circuit 100, and the reactive current $I_m$ is applied to an operational amplifier 18. A limit value $I_{to}$ used in the torque limiting circuit 100 is set by a variable resistor 111. In a case where the effective current $I_t$ detected by the current component detecting circuit 9 is less than the limit value $I_{to}$, the effective current $I_t$ is applied to an operational amplifier 13. While, in a case where the effective current $I_t$ is not less than the limit value $I_{to}$, the limit value $I_{to}$ is applied to the operational amplifier 13. The output side of the operational amplifier 13 is connected to an input terminal $S_1$ of an analog switch 151 and the input side of an operational amplifier 14. The output side of the operational amplifier 14 is connected to another input terminal $D_1$ of the analog switch 151, the control terminal $C_1$ of which is connected to the output terminal of a driving/regenerating discriminating circuit 15. The gains of the operational amplifiers 13 and 14 are made equal to $-k_s$ and $-1$, respectively. The constant $k_s$ is determined so that a correction signal corresponding to an estimated slip angular frequency $\hat{\omega}_s$ is obtained from the effective current $I_t$. Actually, the constant $k_s$ is given by the following equation:

$$\omega_s = k_s \cdot I_t \qquad (1)$$

Since the operational amplifier 13 has a negative gain, the operational amplifier 13 delivers a negative voltage signal corresponding to $-\hat{\omega}_s$. Further, since the operational amplifier 14 has a gain of $-1$, the operational amplifier 14 delivers a positive voltage signal corresponding to $+\hat{\omega}_s$. A control signal supplied to the control terminal $C_1$ of the analog switch 151 controls the switch 151 so that the positive slip angular frequency $+\hat{\omega}_s$ is indicated by the output of the switch 151 when the motor 6 is put in a driving state, and the negative slip angular frequency $-\hat{\omega}_s$ is indicated by the output of the switch 151 when the motor 6 is put in a regenerating state. In FIG. 1, the analog switch 151 is set so that the positive slip angular frequency $+\hat{\omega}_s$ is indicated by the output of the switch 151.

When the discriminating circuit 15 judges that the motor is in a driving state on the basis of a signal generated from acceleration/deceleration command generation circuit 11, the circuit 15 sends a signal having a level "1" to the control terminal $C_1$ of the analog switch 151, to connect the input terminal $D_1$ of the switch 151 to the output terminal $O_1$ thereof. When the discriminating circuit 15 judges that the motor is kept at a regenerating state, the circuit 15 delivers a signal having a level "0", to connect the input terminal $S_1$ of the analog switch 151 to the output terminal $O_1$ thereof.

The output terminal $O_1$ of the analog switch 151 is connected to an input terminal $S_3$ of an analog switch 153, the control terminal $C_3$ of which is connected to the output terminal of a comparator 12. Further, another input terminal $D_3$ of the analog switch 153 is grounded.

The output terminal $O_3$ of the analog switch 153 is connected to a slip angular frequency limiting circuit 101, which puts the value of the slip angular frequency $\hat{\omega}_s$ within a range from an upper limit value $(\omega_s)_{max}$ to a lower limit value $(\omega_s)_{min}$. The slip angular frequency limiting circuit 101 is also connected to the torque limiting circuit 100, to make the upper limit value $(\omega_s)_{max}$ proportional to the effective current $I_t$ delivered from the torque limiting circuit 100. An adder 164 is connected to the output terminal of the slip angular frequency limiting circuit 101 and the output terminal of a subtracter 163. An inverter angular frequency $\omega_1$ indicated by the output of the subtracter 163 is added to the slip angular frequency $\hat{\omega}_s$ by the adder 164, to form an inverter angular frequency command $\omega_1^*$. Positive and negative input terminals of the subtracter 163 are connected to the output terminal of an acceleration/deceleration command generating circuit 11 and the output terminal of an operational amplifier 10. An angular frequency $\omega_R''$ indicated by the output of the operational amplifier 10 is subtracted from an angular frequency $\omega_R'$ which is indicated by the output of the command generating circuit 11, by the subtracter 163, to obtain the inverter angular frequency $\omega_1$.

The angular frequency $\omega_R''$ is used for keeping the motor torque substantially constant even when an overload is applied to the motor. This will be explained later in detail.

The control terminal $C_2$ of an analog switch 152 is connected to the output terminal of the comparator 12, and an input terminal $S_2$ of the switch 152 is grounded. Another input terminal $D_2$ and the output terminal $O_2$ of the switch 152 are connected to the output terminal $O_4$ of an analog switch 154 and the input terminal of the operational amplifier 10, respectively. One and the other input terminals of the comparator 12 are connected to the variable resistor 111 and the torque limiting circuit 100, respectively. The control terminal $C_4$ of the analog switch 154 is connected to the output terminal of the driving/regenerating discriminating circuit 15. Further, one input terminal $D_4$ and the other input terminal $S_4$ of the analog switch 154 are connected to a variable resistor 13 and the output terminal of a subtracter 165, respectively. The positive input terminal of the subtracter 165 is connected to the output terminal of the acceleration/deceleration command generating circuit 11, to be applied with a voltage signal corresponding to $\omega'_R$. Further, the negative input terminal of the subtracter 165 is connected to the variable resistor, to be applied with a voltage signal corresponding to the set value $\omega_R$ of inverter angular frequency. As a result, the input terminal $S_4$ of the analog switch 154 is applied with a signal indicative of a quantity $(\omega'_R - \omega_R)$.

The acceleration/deceleration command generating circuit 11 is supplied with the signal corresponding to the set value $\omega_R$ of inverter angular frequency, and delivers an output in the following manner. In the case of a constant-speed command, the circuit 11 delivers an output indicative of the above set value $\omega_R$. In the case of an acceleration command, the output voltage of the circuit 11 indicative of $\omega'_R$ is increased in accordance with a predetermined time constant, till the angular frequency $\omega'_R$ reaches the set value $\omega_R$. In the case of a deceleration command, the circuit 11 delivers an output indicative of the angular frequency $\omega'_R$ which is obtained by decreasing the set value $\omega_R$ in accordance with the predetermined time constant.

The output terminal of the adder 164 is connected to the input terminal of a voltage-frequency (V/f) converter 16 and an input terminal of an analog-digital (A/D) converter 20. The V/f converter 16 generates a pulse signal having a frequency proportional to the inverter angular frequency command $\omega_1^*$ which is indicated by the output voltage of the adder 164. The V/f converter 16 is connected to a timer circuit 17, which includes an A-timer and a B-timer. The pulses delivered from the V/f converter 16 are applied, as clock pulses, to the A-timer. The A-timer is connected to a data bus line (not shown) in a microcomputer 21. The output of the A-timer operated by the clock pulses from the V/f converter 16 is sent to the above data bus line, to be fetched into the microcomputer 21. The output of the A-timer indicates one period of a pulse width modulating wave. While, the B-timer delivers the 30° phase signal a, which takes a high level and a low level alternately each time the phase angle of a modulated signal based upon the output of the A-timer is advanced by 30°. The current component detecting circuit 9 is connected to the input terminal of the operational amplifier 18, to supply the reactive current $I_m$ to the operational amplifier 18. Three terminals of a variable resistor (namely, a potentiometer) 112 are connected to a control power source, the ground, and the positive input terminal of a subtracter 161. Thus, a fraction of a control source voltage is supplied from the variable resistor 112 to the positive input terminal of the subtracter 161, to be used for indicating the set value $\phi_R$ of magnetic flux. While, the negative input terminal of the subtracter 161 is connected to the output terminal of the operational amplifier 18, to be applied with a magnetic flux value $\phi_o$ (detected value). Thus, the output of the subtracter 161 indicates a flux deviation $\Delta\phi$ which is obtained by subtracting the magnetic flux value $\phi_o$ from the set value $\phi_R$ of magnetic flux, and is applied to the input terminal of an operational amplifier 19, which has a gain of $-1$ and acts as a polarity inverting operational amplifier.

The output terminal of the operational amplifier 19 is connected to the input terminal of an operational amplifier 22 which operates as a first-order lag element. The flux deviation $\Delta\phi'$ indicated by the output of the operational amplifier 22 is given by the following equation:

$$\Delta\phi' = -\frac{\Delta\phi}{1 + T_\phi \cdot s} \quad (2)$$

where $T_\phi$ indicates a time constant, and s Laplacian. In other words, when the step input $\Delta\phi$ is applied to the first-order lag element 22, the output $\Delta\phi'$ varies in accordance with the time constant $T_\phi$ so as to reach the input $\Delta\phi$. The output $\Delta\phi'$ from the operational amplifier 22 and the effective current $I_t$ from the torque limiting circuit 100 are applied to a multiplier 102, to be multiplied by each other. Thus, the output of the multiplier 102 indicates a flux deviation $\Delta\phi''$ which is given by the following equation:

$$\Delta\phi'' = k_\phi \cdot \Delta\phi' \cdot I_t \quad (3)$$

where $k_\phi$ indicates a proportional constant. The output of the multiplier 102 indicative of the flux deviation $\Delta\phi''$ is supplied to one input terminal of an adder 162, the other input terminal of which is connected to the positive input terminal of the subtracter 161. Thus, the flux deviation $\Delta\phi''$ indicated by the output of the multiplier 102 is added to the set value $\phi_R$ of magnetic flux by the adder 162, to form a flux command $\phi^*$. One and the other input terminals of the A/D converter 20 are connected to the output terminal of the adder 164 and the output terminal of the adder 162, respectively, and thus the flux command $\phi^*$ and the inverter angular frequency command $\omega_1^*$ are fetched into the A/D converter 20. The data bus line in the microcomputer 21 is connected to a data bus line (not shown) in the A/D converter 20. Thus, after having been converted into digital values by the A/D converter 20, values of $\phi^*$ and $\omega_1^*$ are loaded in the microcomputer 21.

The microcomputer 21 determines a voltage command V* from the values of $\phi^*$ and $\omega_1^*$ on the basis of the following equation:

$$V^* = k_v \cdot \phi^* \cdot \omega_1^* \quad (4)$$

where $k_v$ indicates a proportional constant.

The data bus line in the microcomputer 21 is also connected to the A-timer, to fetch a pulse signal having a frequency proportional to the inverter angular frequency command $\omega_1^*$, from the A-timer into the microcomputer 21. Sinusoidal wave data corresponding to the pulse signal from the A-timer is stored in the memory of the microcomputer 21. The circuit configuration for forming a pulse width modulating wave from the voltage command V* and the sinunoidal wave data and for forming a pulse width modulated (PWM) signal by using the above modulating wave, is disclosed in, for example, U.S. Pat. No. 4,562,524 granted on Dec. 31, 1985. Accordingly, the explanation of the above circuit configuration will be omitted. The PWM signal made by the microcomputer 21 is applied to the PWM inverter 4.

Next, the operation of the circuit of FIG. 1 will be explained. First, explanation will be made of an operation for producing the effective current $I_t$ and the reactive current $I_m$.

The U-phase primary current $i_{1u}$ and the V-phase primary current $i_{1v}$ which flow through the induction motor 6, are detected by the current transformers 51 and 52, respectively. In the 3-phase forming circuit 7, the W-phase primary current $i_{1w}$ is determined from the primary currents $i_{1u}$ and $i_{1v}$ by utilizing the equilibrium of U-, V- and W-phases. Each of the primary current detection signals $i_u$, $i_v$ and $i_w$ from the 3-phase current forming circuit 7 includes a D.C. component and higher harmonic components. These components are removed by filters (not shown), and the primary current detection signals $i_u$, $i_v$ and $i_w$ thus processed are used for producing the absolute value signals $\bar{i}_u$, $\bar{i}_v$ and $\bar{i}HD$ w. In the present embodiment, the effective current $I_t$ and the reactive current $I_m$ are formed from the absolute value signals $\bar{i}_u$, $\bar{i}_v$ and $\bar{i}_w$.

Figure 3:
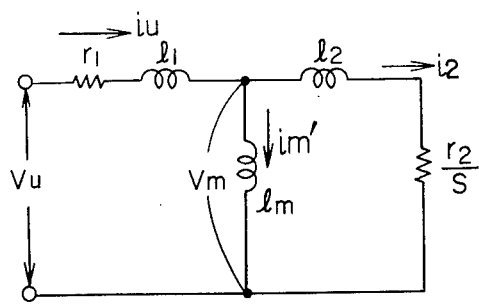
FIG. 3 is a circuit diagram showing an equivalent circuit of one phase of an induction motor.
Figure 4:
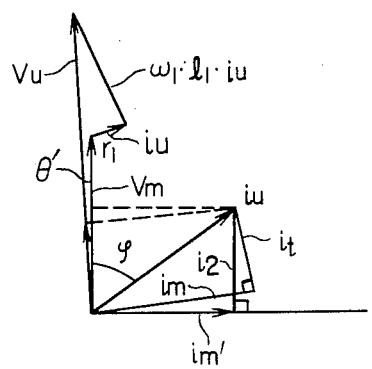
FIG. 4 is a graph showing a relation between the voltage vector and current vector of the induction motor.

FIG. 3 shows the equivalent circuit of a single phase (for example, the U-phase) of the induction motor. When a phase voltage $V_u$ is applied across the exciting coil of the motor, the primary current $i_u$ flows through the primary resistance $r_1$ and the primary leakage inductance $l_1$. As a result, an exciting current $i'_m$ flows through the magnetizing inductance $l_m$, and thus an induced voltage $V_m$ is generated. Further, a secondary current $i_2$ flows through the secondary leakage inductance $l_2$ and the secondary resistance $r_2$. FIG. 4 shows a relation between a current vector and a voltage vector, in the equivalent circuit of FIG. 3.

When a phase difference between the phase voltage $V_u$ and the induced voltage $V_m$ is expressed by $\theta'$, $\cos\theta'$ is given by the following equation:

$$\cos\theta' = \frac{|V_u|^2 + |V_m|^2 - \{r_1^2 + (\omega_1 l_1)^2\}|i_u|^2}{2|V_u| \cdot |V_m|} \quad (5)$$

Now, let us consider a case where a 5.5 KW, 4-pole, 200V, general-purpose indction motor having a rated current of 23 A is operated while keeping the ratio V/f constant.

In a case where the primary frequency $f_1$ is equal to 10 Hz, the resistance $r_1$ is equal to 0.658Ω, and $\omega_1 l_1$ ($=2\pi f_1 l_1$) is equal to 0.18Ω. In this case, $|V_u|$ and $|V_m|$ are equal to $40/\sqrt{3}$ ∇ and 17.8∇, respectively, and $\sqrt{r_2^2+(\omega_1 l_1)^2}|i_u|$ is equal to 15.7/3V. When the above values are substituted into the equation (5), $\cos\theta'$ is nearly equal to 1. Thus, the phase difference $\theta'$ is nearly equal to zero. This fact holds for a case where the primary frequency $f_1$ takes a different value.

Accordingly, the phase difference $\theta'$ between the phase voltage $V_u$ and the induced voltage $V_m$ can be neglected. Referring to FIG. 4, a voltage vector indicating the induced voltage $V_m$ is perpendicular to a current vector indicating the magnetizing current $i'_m$, and another voltage vector indicating the phase voltage $V_u$ is perpendicular to another current vector indicating the reactive current $i_m$. Since the phase difference $\theta'$ between the phase voltage $V_u$ and the induced voltage $V_m$ is neglisibly small, the reactive current $i_m$ is nearly equal to the magnetizing current $i'_m$, and the effective current $i_t$ is nearly equal to the secondary current $i_2$ (corresponding to the load of the motor).

Accordingly, when the phase difference between the phase voltage $V_u$ and the primary current $i_u$ is expressed by $\rho$ the effective current $I_t$ and the reactive current $I_m$ are given by the following equations:

$$I_t = |i_u| \cdot \cos\rho \quad (6)$$

$$I_m = |i_u| \cdot \sin\rho \quad (7)$$

Figure 5:
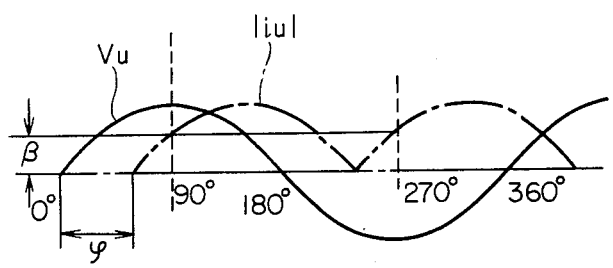
FIG. 5 is a waveform chart showing a phase relation between the U-phase voltage and U-phase primary current of the induction motor.

FIG. 5 shows a method of detecting the effective current $I_t$ from the primary current $I_u$. As can be seen from the equation (6), the effective current $I_t$ is given by the magnitude of the primary current $i_u$ at the 90°-phase with respect to the zero phase of the phase voltage $V_u$. The absolute value of the primary current $i_u$ at the 270°-phase of the phase voltage $V_u$ is equal to the absolute value of $i_u$ at the 90°-phase of the phase voltage $V_u$. That is, the effective current $I_t$ is given by the absolute value of the primary current $i_u$ at the 90°- and 270°-phases of the phase voltage $V_u$. Similarly, the reactive current $I_m$ is given by the absolute value of the primary current $i_u$ at the 0°- and 180°-phase of the phase voltage $V_u$.

In the case where a three-phase current is supplied to the motor, the effective current $I_t$ and the reactive current $I_m$ can be detected from the absolute values $|i_u|$, $|i_v|$ and $|i_w|$ of the primary currents $i_u$, $i_v$ and $i_w$ taken at the following phases of the phase voltage $V_u$.

(1) In a case where the effective current $I_t$ is determined, the absolute value of $i_u$ at the 90°- and 270°-phase, the absolute value of $i_v$ at the 30°- and 210°-phase, and the absolute value of $i_w$ at the 150°- and 330°- phases are detected.

(2) In a case where the reactive current $I_m$ is detected, the absolute value of $i_u$ at the 0°- and 180°-phases, the absolute value of $i_v$ at the 120°- and 300°-phases, and the absolute value of $i_w$ at the 60°- and 240°-phases are detected.

In the above, the absolute values of the primary currents $i_u$, $i_v$ and $i_w$ are detected on the basis of the phase of the phase voltage $V_u$. Alternately, the absolute values may be detected on the basis of the phase of the phase voltage $V_v$, or $V_w$.

Figure 6:
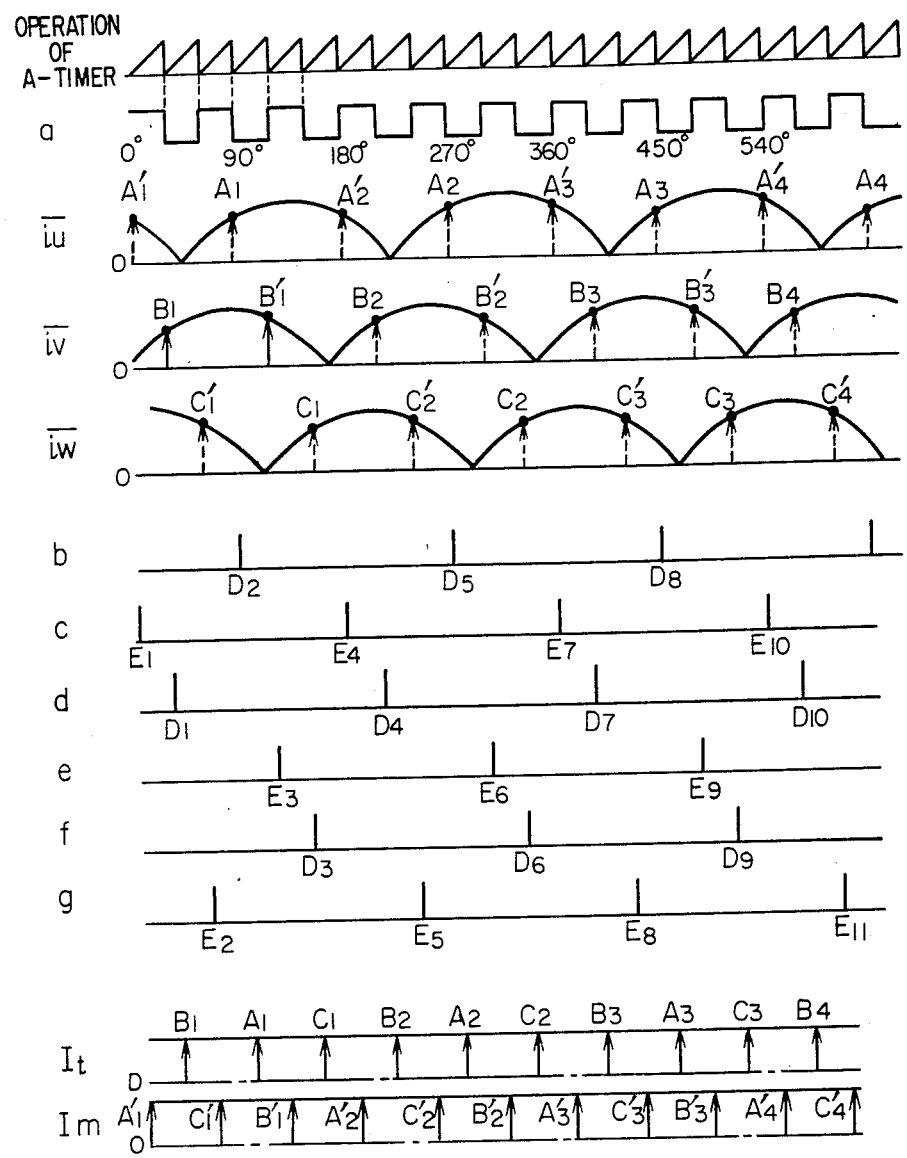
FIG. 6 is a time chart for explaining the operation of the current component detecting circuit of FIG. 2.

FIG. 2 shows the circuit configuration of the current component detecting circuit 9 for detecting the effective current $I_t$ and the reactive current $I_m$ from the absolute values $\overline{i_u}$, $\overline{i_v}$ and $\overline{i_w}$ of the primary currents in the above-mentioned manner, and FIG. 6 is a time chart for explaining the operation of the current component detecting circuit 9.

The A-timer of the timer circuit 17 is operated in synchronism with the 0°- and 360°-phases of the phase voltage $V_u$, and is reset each time the phase angle of the voltage $V_u$ is advanced by 30°. Accordingly, the A-timer performs such an operation as shown in the uppermost row of FIG. 6, and delivers the 30°-phase signal a which takes a level "1" and a level "0" alternatively each time the phase angle of the phase voltage $V_u$ is advanced by 30°.

The sample/hold signals b to g are pulse signals which generate pulses in synchronism with the leading and falling edges of the 30°-phase signal a. The sample/hold signal b generates pulses at time moments $D_2$, $D_5$ and $D_8$ corresponding to the 90°-, 270°- and 450°-phases of the 30°-phase signal a, to sample and hold the absolute values $\overline{OA}_1$, $\overline{OA}_2$ and $\overline{OA}_3$ of the primary current $i_u$ at these time moments. These absolute values make up an effective current $I_{tu}$ detected from the primary current $i_u$. The sample/hold signal c generates pulses at time moments $E_1$, $E_4$, $E_7$ and $E_{10}$ corresponding to the 0°-, 180°-, 360°- and 540°-phases of the 30°-phase signal a, to sample and hold the absolute values $\overline{OA}'_1$, $\overline{OA}'_2$, $\overline{OA}'_3$ and $\overline{OA}'_4$ of the primary current $i_u$ at these time moments. These absolute values make up a reactive current $I_{mu}$ detected from the primary current $i_u$. Similarly, an effective current $i_{tv}$ and a reactive current $I_{mv}$ are detected from the absolute value $i_v$ of the primary current $i_v$ by using the sample/hold signals d and e, and an effective current $I_{tw}$ and a reactive current $I_{mw}$ are detected from the absolute value $\overline{i_w}$ of the primary current $i_w$.

The effective current $I_t$ corresponding to the primary current $i_1$ is given by the sum of the effective currents $I_{tu}$, $I_{tv}$ and $I_{tw}$, and the reactive current $I_m$ corresponding to the primary current $i_1$ is given by the sum of the reactive currents $I_{mu}$, $I_{mv}$ and $I_{mw}$. The sum of the effective currents $I_{tu}$, $I_{tv}$ and $I_{tw}$ and the sum of the reactive currents $I_{mu}$, $I_{mv}$ and $I_{mw}$ are produced by the effective current synthesizing circuit 950 and the reactive current synthesizing circuit 951, respectively. Each of the synthesizing circuits 950 and 951 is formed of a first-order lag element, to suppress a ripple component contained in each of the currents $I_t$ and $I_m$.

The effective current $I_t$ and reactive current $I_m$ thus obtained are used for controlling the slip frequency and the magnetic flux.

The reactive current $I_m$ is applied to the operational amplifier 18, and the effective current $I_t$ is applied to the torque limiting circuit 100.

(I) Let us first consider the case of $I_t < I_{to}$.

When the effective current $I_t$ is less than the limit value $I_{to}$, the effective current $I_t$ from the current component detecting circuit 9 is delivered from the torque limiting circuit 100, as it is. The effective current $I_t$ is multiplied by $-k_s$ at the operational amplifier 13 having a gain of $-k_s$, to be converted into a voltage value corresponding to the slip angular frequency $-\hat{\omega}_s$. The slip angular frequency $-\hat{\omega}_s$ is multiplied by $-1$ at the operational amplifier 14 having a gain of $-1$, to be converted into $+\hat{\omega}_S$. One of the slip angular frequencies $-\hat{\omega}_s$ and $+\hat{\omega}_s$ is selected by the analog switch 151. This selection is made on the basis of the output of the driving/regenerating discriminating circuit 15. When the inverter angular frequency $\omega'_R$ indicated by the output of the acceleration/deceleration command generating circuit 11 is not greater than the set value $\omega_R$ of inverter angular frequency (that is, $\omega'_R \leq \omega_R$), the driving state is maintained, and the discriminating circuit 15 sends a signal having a logical level "1" to the control terminal $C_1$ of the analog switch 151. As a result, the output terminal of the operational amplifier 14 is connected to the output terminal $O_1$ of the analog switch 151, and thus a voltage signal indicative of the slip angular frequency $+\hat{\omega}_s$ is applied to the input terminal $S_3$ of the analog switch 153. Since the effective current $I_t$ is less than the limit value $I_{to}$, a signal having a level "0" is sent from the comparator 12 to the control terminal $C_3$ of the analog switch 153. Thus, the output terminal $O_3$ of the analog switch 153 to the input terminal $S_3$ thereof, and the voltage signal indicative of the slip angular frequency $+\omega$ is applied to the slip angular frequency limiting circuit 101. When the slip angular frequency $+\hat{\omega}_s$ lies between the upper limit $(\omega_s)_{max}$ and the lower limit $(\omega_s)_{min}$, the same voltage signal as delivered from the operational amplifier 14, that is, the voltage signal indicative of $+\hat{\omega}_s$ is supplied from the limiting circuit 101 to one input terminal of the adder 164. The other input terminal of the adder 164 is applied with a voltage signal indicative of the inverter angular frequency $\omega_1$, from the subtracter 163. The positive input terminal of the subtracter 163 is applied with the output of the acceleration/deceleration command generating circuit 11, and the negative input terminal of the subtracter 163 is applied with the output of the operational amplifier 10. That is, the inverter angular frequency $\omega_1$ is obtained by subtracting the angular frequency $\omega_R''$ from the angular frequency $\omega'_R$. When the effective current $I_t$ is less than the limit value $I_{to}$, the comparator 12 delivers the signal having a level "0", and this signal is applied to the control terminal $C_2$ of the analog switch 152. As a result, the input terminal $S_2$ of the analog switch 152 is connected to the output terminal $O_2$ thereof, and the zero voltage is applied to the operational amplifier 10. Accordingly, the angular frequency $\omega_R''$ indicated by the output of the operational amplifier 10 is equal to zero, and the inverter angular frequency $\omega_1$ becomes equal to the angular frequency $\omega_R'$ indicated by the output of the acceleration/deceleration command generating circuit 11. The inverter angular frequency command $\omega_1^*$ is given by the sum of the inverter angular frequency $\omega_1$ (which is equal to the angular frequency $\omega_R'$ in this case) and the slip angular frequency $\hat{\omega}_S$ which is a correction factor, that is, $\omega_1^* = (\omega'_R + \hat{\omega}_S)$.

Next, explanation will be made of an operation for controlling magnetic flux.

The reactive current $I_m$ from the current component detecting circuit 9 is converted by the operational amplifier 18 into a voltage indicative of the magnetic flux $\phi_o$ generated in the motor. That is, the operational amplifier 18 performs an operation which is given by the following equation:

$$\phi_o = \frac{l_m \cdot I_m}{1 + T_2 \cdot s} \tag{8}$$

where $l_m$ indicates the exciting inductance, $T_2$ a secondary time constant, and s Laplacian.

The flux deviation $\Delta\phi$ obtained by subtracting the magnetic flux $\phi_o$ from the set value $\phi_R$ of magnetic flux, is indicated by the output of the substracter 161. The polarity of the output of the subtracter 161 is reversed by the operational amplifier 19, and the polarity of the output of the operational amplifier 19 is reversed by the operational amplifier 22. Accordingly, the flux deviation $\Delta\phi'$ indicated by the output of the operational amplifier 22 has the same polarity as the flux deviation $\Delta\phi$. The product of the flux deviation $\Delta\phi'$ and the effective current $I_t$ is obtained by the multiplier 102, to be used as the flux deviation $\Delta\phi''$. The sum of the flux deviation $\Delta\phi''$ and the set value $\phi_R$ is obtained by the adder 162, to form the flux command $\phi^*$.

As mentioned above, in a case where the effective current $I_t$ is less than the limit value $I_{to}$ (namely, $I_t < I_{to}$) and the angular frequency $\omega_R$ is not less than the angular frequency $\omega_R'$ (namely, $\omega_R \geq \omega_R'$), the flux command $\phi^*$ and the inverter angular frequency command $\omega_1^*$ are given by the following equations:

$$\phi^* = \phi_R + k_{100} \cdot \Delta\phi' \cdot I_t \tag{9}$$

$$\omega_1^* = \omega_R' + k_s \cdot I_t \tag{10}$$

where $k_\phi$ indicates a constant.

The voltage command $V^*$ is calculated from the equation (4) by using the flux command $\phi^*$ of the equation (9) and the inverter angular frequency command $\omega_1^*$ of the equation (10).

Next, explanation will be made of current-and speed-characteristics in a case where a control operation is performed by using the commands $\phi^*$ and $\omega_1^*$ of the equations (9) and (10). First, a steady state (that is, $\omega'_R = \omega_R$) will be explained.

Figure 7:
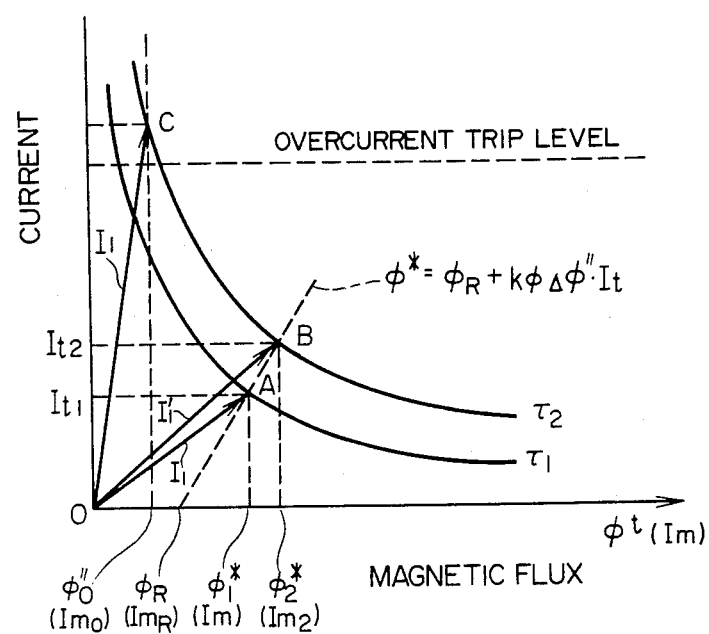
FIG. 7 is a graph showing relations between the flux command (that is, the magnetizing current) and the effective current.
Figure 8:
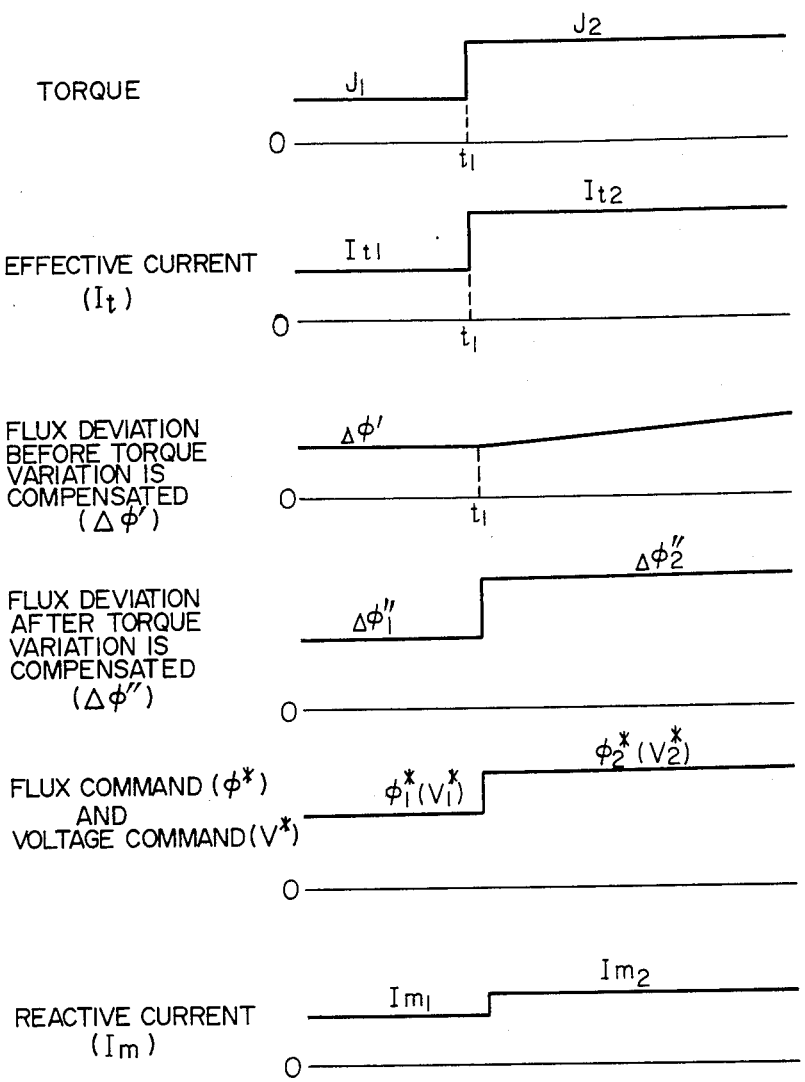
FIG. 8 is a time chart for explaining a flux control operation shown in FIG. 7.

FIG. 7 shows the relation between an magnetizing current and an effective current which flow in accordance with a flux command under a condition that the torque $\tau$ is kept constant. The torque $\tau$ is proportional to the product of the magnetic flux (or the reactive current, namely, the magnetizing current) and the effective current. Accordingly, a state having a constant torque is expressed by a hyperbola. Referring to FIG. 7, let us suppose that the motor is operated at a point A on a constant torque curve $\tau_1$, and the primary current $i_1$ (magnitude $I_1$), that is a reactive current $I_{m1}$ and an effective current $I_{t1}$ flow through the motor on the basis of the flux command $\phi_1^*$. The overcurrent suppressing operation of a control circuit in a case where the torque (load) is abruptly increased from $\tau_1$ to $\tau_2$ at a time moment $t_1$, will be explained below, by using the time chart of FIG. 8. The magnetic flux $\phi_o$ indicated by the output of the operational amplifier 18 varies in accordance with the secondary time constant of the motor. Accordingly, when the torque (load) is abruptly changed from $\tau_1$ to $\tau_2$, a change in magnetic flux is generated later than the above change in torque (load), and the flux $\phi_o$ is nearly equal to the set value $\phi_R$ for some time after the time moment $t_1$. Thus, the flux deviation $\Delta\phi$ indicated by the output of the substracter 161 is substantially equal to zero, and thus the value of the flux deviation $\Delta\phi'$ at a time just after the time moment $t_1$ is equal to the value of $\Delta\phi'$ at a time immediately before the time moment $t_1$. However, the effective current $I_t$ detected by the current component detecting circuit 9 varies in accordance with the change in load. Accordingly, the effective current changes from $I_{t1}$ to $I_{t2}$ at the same speed as in the change of torque (load) from $\tau_1$ to $\tau_2$, and the flux deviation $\Delta\phi''$ which is given by the product of $\Delta\phi'$ and $I_t$ and thus has compensated the change in torque (load), changes from $\Delta\phi_1''$ to $\Delta\phi_2''$ at the same speed as in the change of torque (load). As a result, the flux command $\phi^*$ changes from $\phi_1^*$ to $\phi_2^*$ at the same speed as in the change of torque (load).

While, the voltage command $V^*$, as shown in the equation (4), is determined by the product of the flux command $\phi^*$ and the inverter angular frequency command $\omega_1^*$. The inverter angular frequency command $\omega_1^*$ is given by the sum of the angular frequency $\omega_R'$ indicated by the output of the acceleration/deceleration command generating circuit 11 and the slip angular frequency $\omega_s$ indicated by the output of the slip angular frequency limiting circuit 101. In a steady state that the angular frequency $\omega_R'$ is kept substantially constant, only the slip angular frequency $\hat{\omega}_s$ is affected by the change in torque. However, the value of the slip angular frequency $\hat{\omega}_s$ is less than a few percent of the value of the angular frequency $\omega_R'$. Accordingly, the voltage command $V^*$ is affected only by the change in flux command $\phi^*$. That is, the voltage command $V^*$ changes simultaneously with the change in flux command $\phi^*$. Accordingly, when the torque (load) is changed from $\tau_1$ to $\tau_2$, the magnetizing current changes from $I_{m1}$ to $I_{m2}$, so that the change of the primary current from $I_1$ ($\overline{OA}$) to $I_1'$ ($\overline{OB}$) is only a little, and hence there is no fear of the inverter tripping due to overcurrent.

However, in a case where, in spite of the abrupt change of torque (load) from $\tau_1$ to $\tau_2$, the correction of voltage command according to the present invention is not carried out but the voltage command $V^*$ is kept constant, a voltage drop due to the primary impedance (including the primary resistance $r_1$ and the primary leakage inductance $l_1$) increases, and the induced voltage $V_m$ (shown in FIG. 4) decreases. Hence, as shown in FIG. 7, the reactive current $I_m$ is reduced to $I_{mo}$, and the magnetic flux is reduced to $\phi_o''$. As a result, the primary current is increased abruptly to $I_1''(\overline{OC})$, and thus the inverter trippes because of overcurrent.

Specifically, when the load varies greatly, the voltage drop due to the primary current becomes large, and the inverter is apt to get into the overcurrent trip state.

Further, according to the present embodiment, even in an accelerating state, the voltage drop due to the primary current at an accelerating period is compensated by a flux component dependent upon the effective current $I_t$. Accordingly, the reduction in magnetizing current is prevented, and the overcurrent is suppressed.

Next, explanation will be made of an operation for controlling the inverter angular frequency by using the slip angular frequency.

First, a steady state will be explained.

Figure 9:
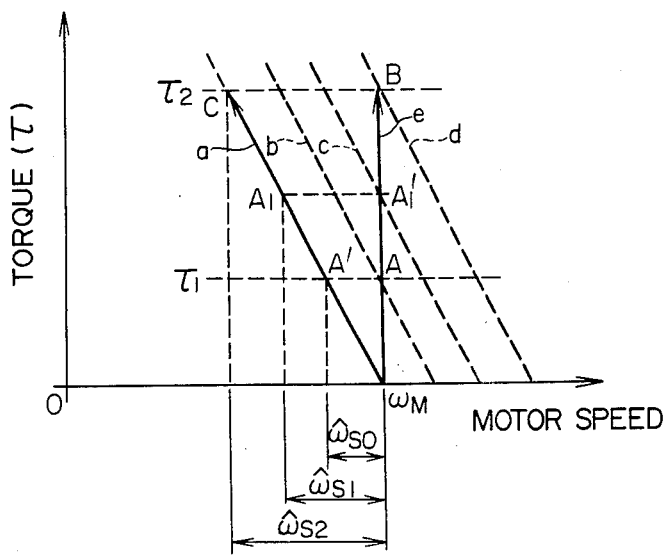
FIG. 9 is a graph showing the torque vs. speed characteristic in a frequency control operation using a slip frequency.

FIG. 9 shows motor-speed vs. torque characteristics. Let us suppose a case where the torque (load) is changed from $\tau_1$ to $\tau_2$. If the control without slip compensation control above mentioned is performed, the motor is driven at a rotational angular velocity $\omega_M$ corresponding to the set value $\omega_R$ of inverter angular frequency. For a load corresponding to the torque $\tau_1$, the slip having an angular frequency $\hat{\omega}_{so}$ is generated. When the torque (load) is changed from $\tau_1$ to $\tau_2$, the slip angular frequency is increased to $\hat{\omega}_{s1}$, and then to $\hat{\omega}_{s2}$, that is, the operating points moves on a torque curve a from a point A' to a point C through a point $A_1$. In this case, the rotational angular velocity $\omega_M$ is decreased to $(\omega_M - \omega_{s1})$, and then to $(\omega_M - \hat{\omega}_{s2})$.

While, according to the present embodiment, the effective current flows so as to correspond to the load. Thus, the desired torque is efficiently generated without causing an overcurrent, and the reduction in motor speed is prevented.

In a case where the magnetic flux is made equal to the set value $\phi_R$ by the above-mentioned flux control operation, the effective current $I_t$ detected by the current component detecting circuit 9 is proportional to the slip. In view of this fact, the effective current $I_t$ is multiplied by $-k_s$ at the operational amplifier 13, to obtain the slip angular frequency $-\hat{\omega}_s$. The output of the operational amplifier is multiplied by $-1$ at the operational amplifier 14, to obtain the slip angular frequency $+\hat{\omega}_s$. When the driving/regenerating discriminating circuit 15 judges that the motor is kept at an accelerating or steady state, a signal having a level "1" is sent from the discriminating circuit 15 to the control terminal $C_1$ of the analog switch 151, and the output terminal $O_1$ of the switch 151 is connected to the input terminal $D_1$ thereof. Thus, the positive slip angular frequency $+\hat{\omega}_s$ is added to the angular frequency $\omega_R'$ ($=\omega_1$) indicated by the output of the acceleration/deceleration command generating circuit 11, to obtain the inverter angular frequency command signal $\omega_1^*$. That is, the inverter angular frequency $\omega_R'$ is increased by the value of the positive slip angular frequency $+\hat{\omega}_s$ proportional to the effective current $I_t$. That is, the inverter angular frequency $\omega_R'$ is increased by the slip angular frequency $\hat{\omega}_{so}$ which generates at the operating point A' having the torque $\tau_1$. Thus, the operating point A' moves to a point A on a torque curve b, and the rotational angular velocity of the motor becomes equal to $\omega_M$. When the torque (load) is increased from $\tau_1$ to $\tau_2$, the slip angular frequencies $\hat{\omega}_{s1}$ and $\hat{\omega}_{s2}$ are successively added to the inverter angular frequency $\omega'_R$, to compensate the reduction in motor speed. Thus, the corrected inverter angular frequency is indicated by a point $A_1'$, on a torque curve c and a point B on a torque curve d. As mentioned above, the inverter angular frequency is corrected in accordance with the change in slip angular frequency. Thus, the motor torque can be continuously increased without changing the rotational angular velocity $\omega_M$, as indicated by a solid line e. rotational angular velocity $\omega_M$ is equal to the inverter angular frequency $\omega'_R$ at a time the slip angular frequency is equal to zero. That is, according to the present embodiment, the rotational angular frequency $\omega_M$ follows the inverter angular frequency $\omega'_R$ indicated by the output of the acceleration/deceleration command generating circuit 11, even when the load of the motor is changed. In an accelerating state, also, the above control operation is performed, and thus the rotational angular velocity $\omega_M$ can follow the inverter angular frequency $\omega'_R$.

In the above, explanation has been made of the flux control operation and the inverter angular frequency control operation using the slip angular operation in a steady or accelerating state. Next, these control operations in a decelerating state will be explained. First, explanation will be made of the flux control operation. In a decelerating state, a large induced voltage is generated in the motor, and the flux $\phi_o$ indicated by the output of the operational amplifier 18 becomes greater than the set value $\phi_R$. In this case, the flux deviation $\Delta\phi$ indicated by the output of the subtracter 161 becomes negative, and the flux deviation $\Delta\phi''$ having compensated a change in torque (load) becomes negative. Accordingly, the flux command $\phi^*$ given by the sum of $\Delta\phi''$ and $\phi_R$ is decreased by the value of $\Delta\phi''$. Accordingly, the voltage command $V^*$ is also decreased. Thus, the increase in magnetizing current is suppressed, and the generation of overcurrent in a regenerative period is prevented.

Next, explanation will be made of the inverter angular frequency control operation using the slip angular frequency. In a decelerating state, the slip angular frequency takes a negative value. Accordingly, when the driving/regenerating discriminating circuit 15 judges that the motor is kept at the decelerating state, a signal having a level "0" is sent from the discriminating circuit 15 to the control terminal $C_2$ of the analog switch 151. As a result, the input terminal $S_1$ of the switch 151 is connected to the output terminal $O_1$ thereof, and the negative slip angular frequency $-\hat{\omega}_s$ indicated by the output of the operational amplifier 13 is added to the inverter angular frequency $\omega'_R$. In the decelerating state, also, the inverter angular frequency is corrected in proportion to a decelerating torque; and hence the rotational angular velocity $\omega_M$ can follow the inverter angular frequency $\omega'_R$.

(II) Now, explanation will be made of the case of $I_t \geq I_{to}$.

Let us suppose that the load is increased so as to exceed the rated torque of the motor by a great deal. A steady state will first be explained. When the effective current $I_t$ is larger than the limit value $I_{to}$, a signal having a level "1" is sent from the comparator 12 to the control terminal $C_2$ of the analog switch 152. As a result, the input terminal $D_2$ of the switch 152 is connected to the output terminal $O_2$ thereof. Furhter, a signal having a level "1" is sent from the driving-/regenerating discriminating circuit 15 to the control terminal $C_4$ of the analog switch 154, and thus the input terminal $D_4$ of the switch 154 is connected to the output terminal $O_4$ thereof. As a result, a voltage indicative of the inverter angular frequency $\omega_R$ is applied to the operational amplifier 10. Thus, the inverter angular frequency $\omega_R$ is converted into an angular frequency $\omega_R''$ which is given by the following equation:

$$\omega_R'' = \frac{\omega_R}{1 + T_l \cdot s} \quad (11)$$

where $T_1$ indicates a time constant, and s Laplacian.

In the steady state, the inverter angular frequency $\omega_R'$ indicated by the acceleration/deceleration command generating circuit 11 is equal to the set value $\omega_R$. Accordingly, the inverter angular frequency $\omega_1$ indicated by the output of the subtracter 163 is equal to a value which is obtained by subtracting the angular frequency $\omega_R''$ from the set value $\omega_R$.

In the present case, the signal having the level "1" from the comparator 12 is applied to the control terminal $C_3$ of the analog switch 153, and thus the input terminal $D_3$ of the switch 153 is connected to the output terminal $O_3$ thereof. As a result, the slip angular frequency $\hat{\omega}_s$ becomes equal to zero, and the inverter angular frequency command $\omega_1^*$ is obtained by subtracting the angular frequency $\omega_R''$ from the set value $\omega_R$, that is, is given by the following equation:

$$\omega_1^* = \omega_R - \omega_R'' \quad (12)$$

In other words, as can be seen from the equations (11) and (12), the command $\omega_1^*$ decreases with the increasing angular frequency $\omega_R''$.

Figure 10:
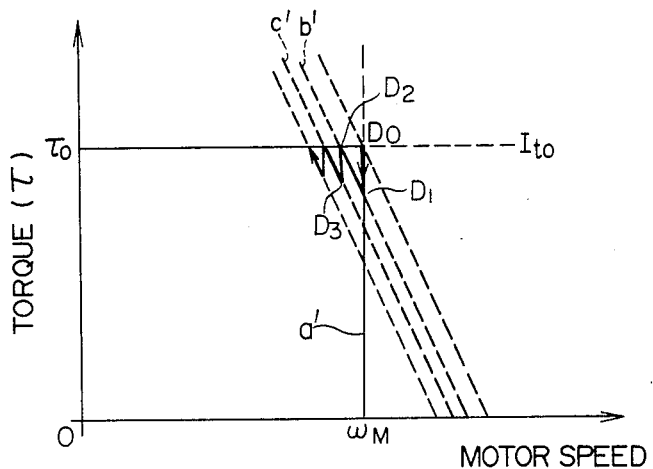
FIG. 10 is a graph for explaining a control operation for keeping the motor torque substantially constant, when the motor kept at a steady state is applied with an overload.

FIG. 10 shows a control operation for keeping the motor torque constant and suppressing the increase of current, even when the effective current $I_t$ is greater than the limit value $I_{to}$. Let us suppose that the motor is driven at the rotational angular velocity $\omega_M$ equal to the set value $\omega_R$ of inverter angular frequency. The inverter angular frequency is corrected by the slip angular frequency till the effective current reaches the limit value $I_{to}$. That is, the torque increases to a point $D_o$ along a torque curve a', and thus the rotational angular velocity is kept constant. When the torque increases to the point $D_o$, that is, the effective current reaches the limit value $I_{to}$, a signal having the level "1" is sent from the comparator 12 to the analog switch 153, and the input terminal $D_3$ of the switch 153 is connected to the output terminal $O_3$ thereof. Thus, the slip angular frequency $\hat{\omega}_s$ becomes equal to zero, and the correction of the inverter angular frequency by the slip angular frequency is stopped. Accordingly, as is evident from the equations (11) and (12), the inverter angular frequency command $\omega_1^*$ decreases in accordance with the time constant $T_1$. According to decreasing of the angular frequency command $\omega_1^*$, the voltage/frequency ratio is increased, so that the magnetic flux (magnetizing current) is increased. At this time, if the load torque is constant, the effective current is decreased since the motor torque is determined by the product of the magnetizing current and the effective current. As a result, the torque curve moves to a curve b', and the operating point shifts from point $D_o$ to point $D_1$. However, since a load torque corresponding to an effective current greater than the limit value $I_{to}$ is applied to the motor, the effective current $I_t$ is increased from the point $D_1$ to a point $D_2$, to reach the limit value $I_{to}$. Then, the inverter angular frequency command signal $\omega_1^*$ again decreases in accordance with the time constant $T_1$. In the same manner, the torque curve moves to a curve c'. Thus, the operating point shifts from point $D_2$ to point $D_3$, and the effective current is again reduced.

The above operation is repeated till the angular frequency $\omega_R''$ becomes equal to the set value $\omega_R$, provided that a load torque corresponding to an effective current greater than the limit value $I_{to}$ is applied to the motor. Finally, the inverter angular frequency command $\omega_1^*$ becomes equal to zero, and the motor is stopped.

In FIG. 10, the torque is changed along a path $D_o \rightleftarrows D_1 \rightleftarrows D_2 \ldots$, to facilitate the understanding of the above control operation. However, the present embodiment decreases the inverter angular frequency command $\omega_1^*$ continuously while monitoring the effective current proportional to the torque, and hence decreases the motor speed while maintaining a constant motor torque $\tau_o$ corresponding to the limit value $I_{to}$.

As mentioned above, when the effective current is less than the limit value $I_{to}$, the control operation is performed so that the motor torque varies on a constant speed line $\omega_M D_o$, and when the effective current is greater than the limit value $I_{to}$, the control operation is performed so that the motor speed is not kept constant but the motor torque is kept constant as indicated by a line $\tau_o D_o$.

When the load is reduced, so that the effective current becomes lower than the limit value $I_{to}$ during above mentioned control, the operating point moves on the constant torque line $\tau_o D_o$ and then moves to that point on the constant speed line $\omega_M D_o$ and then the motor is controlled on a torque curve whose torque is balanced with a load on the constant speed line.

Figure 11A:
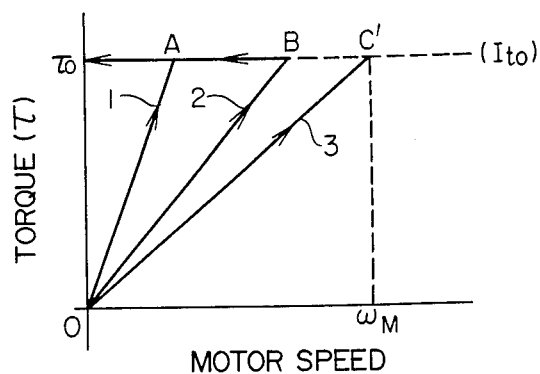
FIGS. 11A to 11D are graphs for explaining the speed vs. torque characteristic of a motor in a case where the motor kept at an accelerating state is applied with an overload.
Figure 11B:
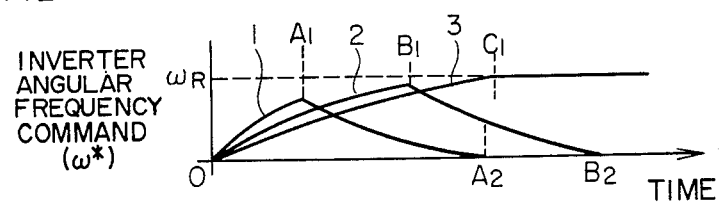
Figure 11C:
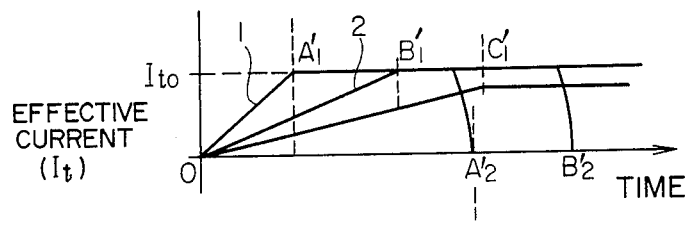
Figure 11D:
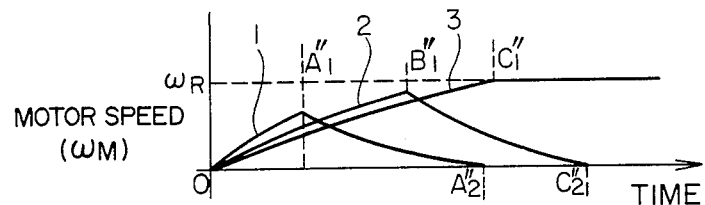

Next, explanation will be made of a control operation in a case where the effective current $I_t$ becomes greater than the limit value $I_{to}$ in an accelerating state. FIGS. 11A to 11D show various characteristics in a case where the inverter angular frequency $\omega_R'$ is increased to the set value $\omega_R$. In more detail, FIG. 11A shows torque vs. speed characteristics, FIG. 11B inverter angular frequency command vs. time characteristics, FIG. 11C effective current vs. time characteristics, and FIG. 11D motor speed vs. time characteristics. When an input voltage indicative of the set value $\omega_R$ of inverter angular frequency is applied to the acceleration/deceleration command generating circuit 11, the output voltage thereof indicates the inverter angular frequency $\omega_R'$ which is given by the following equation:

$$\omega_R' = \frac{\omega_R}{1 + T_A \cdot s} \quad (13)$$

where $T_A$ indicates a time constant, and s Laplacian.

An accelerating time and a decelerating time are determined by the time constant $T_A$. In FIGS. 11A to 11D, characteristic curve ①, characteristic curve ② and characteristic curve ③ correspond to small, intermediate and large values of the time constant $T_A$, respectively. Let us consider a case where the accelerating time is short, that is, the characteristic curves ① or ② are formed. When the motor is accelerated, the effective current $I_t$ gradually increases, and it is detected by the comparator 12 that the effective current $I_t$ becomes greater than the limit value $I_{to}$ at a time $A_1$ or $B_1$. Then, a signal having a level "1" is sent from the comparator 12 to the control terminal $C_2$ of the analog switch 152, to connect the input terminal $D_2$ to the output terminal $O_2$. Further, a signal having a level "1" for indicating a driving state is sent from the driving-/regeenrating discriminating circuit 15 to the control terminal $C_4$ of the analog switch 154, to connect the input terminal $D_4$ to the output terminal $O_4$. Thus, a signal indicative of the set value $\omega_R$ of inverter angular frequency is applied to the operational amplifier 10.

As a result, the angular frequency $\omega_R''$ indicated by the output of the operational amplifier 10 gradually increases from zero in accordance with the time constant $T_l$. Thus, the inverter angular frequency command $\omega_1^*$ gradually decreases after the time $A_1$ or $B_1$ at which the effective current $I_t$ becomes greater than the limit value $I_{to}$. In other words, the inventer angular frequency command $(\omega_1^*$ is decreased so as to make the effective current $I_t$ equal to the limit value $I_{to}$.

As a result, the motor speed decreases to zero along a constant torque line $(\tau = \tau_o)$ of the torque vs. speed characteristic curve ① or ② shown in FIG. 11A. Incidentally, the characteristic curves ③ of FIGS. 11A to 11D show a case where the motor is accelerated to a desired speed while keeping the effective current $I_t$ less than the limit value $I_{to}$.

Next, explanation will be made of the control operation in a case where an overcurrent is generated by reducing the inverter angular frequency from the set value $\omega_R$ to zero.

Figure 12:
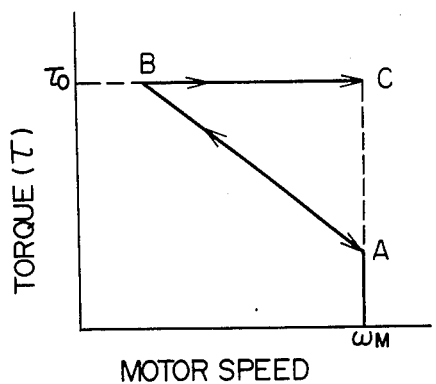
FIG. 12 is a graph for explaining the speed vs. torque characteristic of the motor in a case where the motor kept at a decelerating state is applied with an overload.

FIG. 12 shows a case where the motor which is applied with the torque indicated by a point A and is driven at an rotational angular velocity $\omega_M$ equal to the set value $\omega_R$ of inverter angular frequency, is decelerated, and the effective current $I_t$ exceeds the limit value $I_{to}$ at a point B. When the motor is put in a decelerating state, a signal having a level "0" is sent from the driving-/regenerating discriminating circuit 15 to the control terminal $C_4$ of the analog switch 154, and thus the output terminal of the subtracter 165 is connected to the output terminal $O_4$ of the switch 154 through the input terminal $S_4$ thereof. When the effective current $I_t$ exceeds the limit value $I_{to}$, a signal having a level "1" is sent from the comparator 12 to the control terminal $C_2$ of the analog switch 152, to connect the input terminal $D_2$ of the switch 152 to the output terminal $O_2$ thereof. Thus, a signal indicative of $(\omega_R' - \omega_R)$ is sent from the output terminal of the subtracter 165 to the operational amplifier 10, and the angular frequency $\omega_R-$ indicated by the output of the operational amplifier 10 is gradually increased from zero to $(\omega_R' - \omega_R)$ in accordance with the time constant $T_1$. As a result, the angular frequency $\omega_1$ indicated by the output signal of the subtracter 163 is gradually increased to $\omega_R$. Further, since the input terminal $D_3$ of the analog switch 153 is connected to the output terminal $O_3$ thereof, the slip angular frequency $\hat{\omega}_s$ is equal to zero. Thus, the inverter angular frequency command $\omega_1^*$ varies in the same manner as in the angular frequency $\omega_1$.

When the inverter angular frequency command $\omega_1^*$ is increased at the point B of FIG. 12, the regenerative power having been generated in the decelerating period is consumed, and thus the primary current decreases. However, when the angular frequency $\omega_R'$ is decreased, the primary current is again increased abruptly to the limit value $I_{to}$, and the inverter angular frequency command $\omega_1^*$ is again increased. The above control operation is performed, while judging whether or not effective current $I_t$ exceeds the limit value $I_{to}$, and hence the operating point moves continuously on a line BC of FIG. 12. When the operating point reaches a point C, the effective current $I_t$ becomes smaller than the limit value $I_{to}$, and the control operation utilizing a slip angular frequency is performed. Thus, the operating point moves on a constant speed line CA, to return to the point A.

The same flux control operation as in a case where the effective current $I_t$ is less than the limit value, is performed in a case where the effective current $I_t$ is not less than $I_{to}$. Accordingly, explanation of the flux control operation will be omitted.

As has been explained in the foregoing, according to the present embodiment, even when an overload is applied to the motor, the inverter does not get into the overcurrent trip state and the motor is controlled so as to keep constant the motor torque thereof. Accordingly, in a case where a cutting machine is connected to the induction motor, even if an abrupt change in load is generated in a machining period, a workpiece will be prevented from being damaged, since the torque of the motor is kept constant. Further, according to the present embodiment, it is easy to optimize the accelerating time and the decelerating time of the motor.

Next, explanation will be made of another example of a flux control operation.

Figure 13:
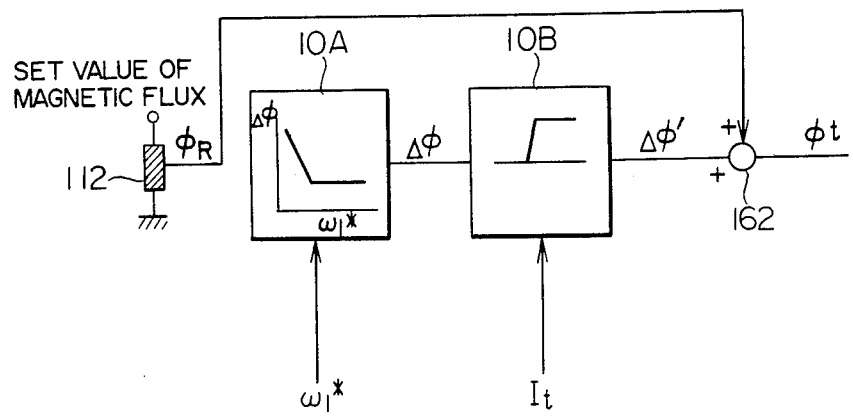
FIG. 13 is a circuit diagram showing another example of the flux control part of FIG. 1.

FIG. 13 shows a circuit part for carrying out the above example. Referring to FIG. 13, a multiplicity of values of the inverter angular frequency command $\omega_1^*$ and values of the flux compensating quantity $\Delta\phi$ corresponding appropriately to the above values are previously stored in a flux compensation table 10A. The table 10A is connected to a flux limiting circuit 10B, and is applied with a signal indicative of the inverter angular frequency command $\omega_1^*$, and thus the flux limiting circuit 10B is applied with a signal which indicates the flux compensating value $\Delta\phi$ corresponding to the command $\omega_1^*$. The circuit 10B is also applied with a signal indicative of the effective current $I_t$. Thus, a signal indicative of flux compensating value $\Delta\phi'$, which is corrected based on a torque (load), is sent from the flux limiting circuit 10B to one input terminal of an adder 162. Further, a signal indicative of the set value $\phi_R$ of magnetic flux is sent from the variable resistor 112 to the other input terminal of the adder 162. Thus, the adder 162 delivers an output signal indicative of the magnetic flux command $\phi^*$ which is the sum of $\Delta\phi'$ and $\phi_R$. The flux command $\phi^*$ is given to the microcomputer 21 of FIG. 1, to obtain the voltage command $V^*$, which is proportional to the product of $\phi^*$ and $\omega_1^*$. A circuit part for obtaining the inverter angular frequency command $\omega_1^*$ has the same construction as shown in FIG. 1, and hence explanation of the above circuit part will be omitted.

Next, explanation will be made of the flux control operation of the circuit part of FIG. 13. The flux compensation table 10A is formed so that the flux compensating value $\Delta\phi$ becomes large for small values of inverter angular frequency command $\omega_1^*$ (that is, in a low speed range), and becomes small for large values of $\omega_1^*$ (that is, in a high speed range).

The flux compensating value $\Delta\phi$ is made large in the low speed range for the following reason. In the low speed range, the voltage drop due to the primary impedance increases, and thus the magnetic flux decreases. The decrease in magnetic flux is compensated by increasing the flux compensating value $\Delta\phi$. A maximum value of $\Delta\phi$ in the low speed range is determined so that a predetermined starting torque is generated at a predetermined frequency. The flux compensating value $\Delta\phi$ is determined in accordance with the inverter angular frequency command $\omega_1^*$. The flux compensating value $\Delta\phi$ obtained from the table 10A is equal to the flux correcting value $\Delta\phi'$ which is indicated by the output of the flux limiting circuit 10B at a time when the effective current $I_t$ is equal to the limit value $I_{to}$. That is, the flux compensating value $\Delta\phi'$ indicated by the output of the circuit 10B is given by the following equation:

$$\Delta\phi' = \Delta\phi \cdot (I_t/I_{to}) \quad (13)$$

The magnetic flux command $\phi^*$ is obtained by adding the flux compensating value $\Delta\phi'$ to the set value $\phi_R$, that is, is given by the following equation:

$$\phi^* = \phi_R + \Delta\phi \cdot (I_t/I_{to}) \quad (14)$$

The value of $\Delta\phi'$ increases in proportion to the load. Accordingly, a reduction in magnetizing current caused by the increase in load can be suppressed by using the flux compensating value $\Delta\phi'$. Thus, the generation of an overcurrent due to the abrupt increase in load can be prevented.

The magnetizing current is dependent upon the capacity of the motor. When a plurality of $\Delta\phi - \omega_1^*$ characteristic curves are previously stored in the table 10A and one of the characteristic curves is selected so that the starting torque of the motor becomes maximum, the above control method is applicable to motors having a wide range of capacity.

In the present embodiment, the effective current $I_t$ and the reactive current $I_m$ are obtained by sampling the primary currents at specified phase angles of a phase voltage (for example, the U-phase voltage). Alternatively, the effective current $I_t$ and the reactive current $I_m$ may be calculated from the U-phase primary current $i_{1u}$ and the V-phase primary current $i_{1v}$ by the following equations:

$$\begin{pmatrix} I_m \\ I_t \end{pmatrix} = \begin{pmatrix} \cos\theta & \sin\theta \\ -\sin\theta & \cos\theta \end{pmatrix} \begin{pmatrix} \sqrt{3/2} & 0 \\ \sqrt{1/2} & \sqrt{2} \end{pmatrix} \begin{pmatrix} i_{1u} \\ i_{1v} \end{pmatrix} \quad (15)$$

$$\theta = \int \omega_1^* dt \quad (16)$$

where $\omega_1^*$ indicates the inverter angular frequency command.

The above method is complicated in calculation, but can determine the values of $I_m$ and $I_t$ rapidly from the primary currents $i_{1u}$ and $i_{1v}$. Accordingly, this method is effective for a case where the abrupt change in load is repeated a large number of times.

Further, the effective current $I_t$ may be approximated from the D.C. input current $I_D$ of the inverter. In a case where the D.C. input voltage of the inverter is kept constant, and where not only the loss at the inverter but also the copper loss (namely, ohmic loss) and iron loss (namely, core loss) in the motor are neglisibly small, the effective current $I_t$ is given by the following formula:

$$I_t \alpha I_D / \omega_R \quad (17)$$

We claim:
1. A control system for a PWM inverter which drives an induction motor, said control system comprising:
 a PWM inverter of the constant V/f ratio type;
 current component detecting means for detecting an effective current from the motor current of the induction motor, said effective current being proportional to a load applied to said induction motor;
 frequency setting means for setting the output frequency of said inverter;
 flux setting means for setting the amount of magnetic flux generated in said induction motor;
 correcting-frequency calculating means for calculating a frequency correcting quantity proportional to said effective current;
 correcting-flux calculating means for calculating a flux correcting quantity proportional to said effective current;
 comparator means for comparing the detected effective current with a predetermined value;
 frequency command forming means for forming a frequency command signal for said inverter by adding said frequency correcting quantity to said set output frequency, when it is judged by said comparator means that said effective current is less than said predetermined value;
 voltage command forming means for forming a voltage command signal for said inverter by producing the sum of said set amount of magnetic flux and said flux correcting quantity and by producing the product of said sum and said frequency command signal, when it is judged by said comparator means that said effective current is less than said predetermined value; and inverter control means for controlling said inverter on the basis of said frequency command signal from said frequency command forming means and said voltage command signal from said voltage command forming means.

2. A control system according to claim 1, wherein said current component detecting means includes means for detecting a reactive current, and said control system further comprises means for varying said flux correcting quantity in accordance with said reactive current.

3. A control system according to claim 2, wherein said current component detecting means includes sampling means for sampling the inverter output current of each phase at specified phase angles thereof, to form said effective current on the basis of sampled values of said inverter output current.

4. A control system according to claim 3, wherein a value dependent upon the reactive current detected by said current component detecting means is subtracted from the set value of magnetic flux, and the result of the subtraction is applied to said correcting-flux calculating means, to obtain said flux correcting quantity.

5. A control system for a PWM inverter which drives an induction motor, said control system comprising:

a PWM inverter of the constant V/f ratio type;

current component detecting means for detecting an effective current from the motor current of the induction motor, said effective current being proportional to a load applied to said induction motor;

frequency setting means for setting the output frequency of said inverter;

flux setting means for setting the amount of magnetic flux generated in said induction motor;

comparator means for delivering an excess current signal when said effective current is not less than a predetermined value;

means responsive to said excess current signal from said comparator means, to reduce the set output frequency from said frequency setting means, in accordance with a predetermined time constant;

frequency command forming means for forming a frequency command signal for said inverter, on the basis of said output frequency which decreases in accordance with said predetermined time constant;

voltage command forming means for forming a voltage command signal for said inverter, on the basis of said frequency command signal and said set amount of magnetic flux; and inverter control means for controlling said inverter on the basis of said frequency command signal and said voltage command signal.

6. A control system according to claim 5, wherein said voltage command forming means includes means for producing the product of said set amount of magnetic flux and said frequency command signal, to form said voltage command signal.

7. a control system for a PWM inverter which drives an induction motor, said control system comprising:

a PWM inverter of the constant V/f ratio type;

current comppont detecting means for detecting an effective current from the motor current of the induction motor, said effective current being proportional to a load applied to said induction motor;

frequency setting means for setting the output frequency of said inverter;

flux setting means for setting the amount of magnetic flux generated in said induction motor;

correcting-frequency calculating means for calculating a frequency correcting quantity proportional to said effective current;

correcting-flux calculating means for calculating a flux correcting quantity proportional to said effective current;

comparator means for comparing the detected effective current with a predetermined value;

first frequency command forming means for forming a first frequency command signal for said inverter by adding said frequency correcting quantity to said set output frequency, when it is judged by said comparator means that said effective current is less than said predetermined value;

first voltage command forming means for forming a first voltage command signal for said inverter by producing the sum of said set amount of magnetic flux and said flux correcting quantity and by producing the product of said sum and said first frequency command signal, when it is judged by said comparator means that said effective current is less than said predetermined value;

means for reducing said set output frequency in accordance with a predetermined time constant when it is judged by said comparator means that said effective current is not less than said predetermined value;

second frequency command forming means for forming a second frequency command signal for said inverter, on the basis of said output frequency which reduces in accordance with said predetermined time constant;

second voltage command forming means for forming a second voltage command signal for said inverter, on the basis of said set amount of magnetic flux and said second frequency command signal; and inverter control means for controlling said inverter on the basis of one of the combination of said first frequency command signal and said first voltage command signal and the combination of said second frequency command signal and said second voltage command signal.

8. A control system according to claim 7, wherein said current component detecting means includes means for detecting a reactive current, and said control device further comprises means for varying said flux correcting quantity in accordance with said reactive current.

9. A control system according to claim 8, wherein said current component detecting means includes sampling means for sampling the inverter output current of each phase at specified phase angles thereof, to form said effective current on the basis of sampled values of said inverter output current.

* * * * *